(12) United States Patent
Amat

(10) Patent No.: US 10,704,014 B1
(45) Date of Patent: Jul. 7, 2020

(54) WATER PURIFICATION SYSTEM

(71) Applicant: HbrewO Systems, LLC, Atlanta, GA (US)

(72) Inventor: Michael Amat, Atlanta, GA (US)

(73) Assignee: HBREWO SYSTEMS, LLC, Atlanta, GA (US)

( * ) Notice: Subject to any disclaimer, the term of this patent is extended or adjusted under 35 U.S.C. 154(b) by 170 days.

(21) Appl. No.: 15/584,023

(22) Filed: May 2, 2017

(51) Int. Cl.
| | | |
|---|---|---|
| C02F 1/28 | (2006.01) | |
| C02F 1/42 | (2006.01) | |
| C02F 1/44 | (2006.01) | |
| C12C 5/00 | (2006.01) | |
| C02F 9/00 | (2006.01) | |
| C02F 1/00 | (2006.01) | |

(52) U.S. Cl.
CPC .............. *C12C 5/002* (2013.01); *C02F 1/003* (2013.01); *C02F 1/42* (2013.01); *C02F 9/00* (2013.01); *C02F 9/005* (2013.01); *C02F 1/001* (2013.01); *C02F 1/008* (2013.01); *C02F 1/283* (2013.01); *C02F 1/441* (2013.01)

(58) Field of Classification Search
CPC .......... C02F 1/001; C02F 1/002; C02F 1/003; C02F 1/008; C02F 1/283; C02F 1/42; C02F 1/441; C02F 9/00; C02F 9/005; C12C 5/002

See application file for complete search history.

(56) References Cited

U.S. PATENT DOCUMENTS

| | | | | |
|---|---|---|---|---|
| 3,526,320 | A * | 9/1970 | Kryzer | B01D 61/08 210/254 |
| 5,004,535 | A * | 4/1991 | Bosko | B01D 61/08 210/257.2 |
| 5,660,720 | A * | 8/1997 | Walling | B01D 61/10 137/594 |
| 7,387,210 | B2 * | 6/2008 | Burrows | B01D 35/153 210/443 |
| 2007/0256977 | A1 * | 11/2007 | Schmitt | B01D 61/025 210/652 |

* cited by examiner

*Primary Examiner* — Matthew O Savage
(74) *Attorney, Agent, or Firm* — Law Office of Michael O'Brien; Michael O'Brien

(57) ABSTRACT

A water purification system is configured to create a treated water for a home brewing operation. The water purification system includes a sediment filter, connected to an untreated water source. Untreated water flows from the untreated water source through the sediment filter creating a sediment filtered water. A carbon filter is connected to the sediment filter. The sediment filtered water flows through the carbon filter creating a carbon filtered water. A reverse osmosis system is connected to the carbon filter. The carbon filtered water flows through the reverse osmosis system and is segregated into a treated water and a rejected water. The treated water is distributed to the come brewing operation. A deionizing filter is connected to the reverse osmosis system with an automatic shutoff valve. The deionizing filter receives a second flow of treated water and creates a deionized water.

2 Claims, 2 Drawing Sheets

WATER PURIFICATION SYSTEM

BACKGROUND

The embodiments herein relate generally to water purification systems. Prior to embodiments of the disclosed invention there was no condensed water purification system that was appropriate for small home brew operations. Embodiments of the disclosed invention solve these problems.

SUMMARY

A water purification system is configured to create a treated water for a home brewing operation. The water purification system includes a sediment filter, connected to an untreated water source. Untreated water flows from the untreated water source through the sediment filter creating a sediment filtered water. A carbon filter is connected to the sediment filter. The sediment filtered water flows through the carbon filter creating a carbon filtered water. A reverse osmosis system is connected to the carbon filter. The carbon filtered water flows through the reverse osmosis system and is segregated into a treated water and a rejected water. The treated water is distributed to the come brewing operation.

A flow restrictor is connected to the reverse osmosis system with an automatic shutoff valve. The flow restrictor is configured to regulate a first flow of a rejected water line.

A deionizing filter is connected to the reverse osmosis system with an automatic shutoff valve. The deionizing filter receives a second flow of treated water and creates a deionized water.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
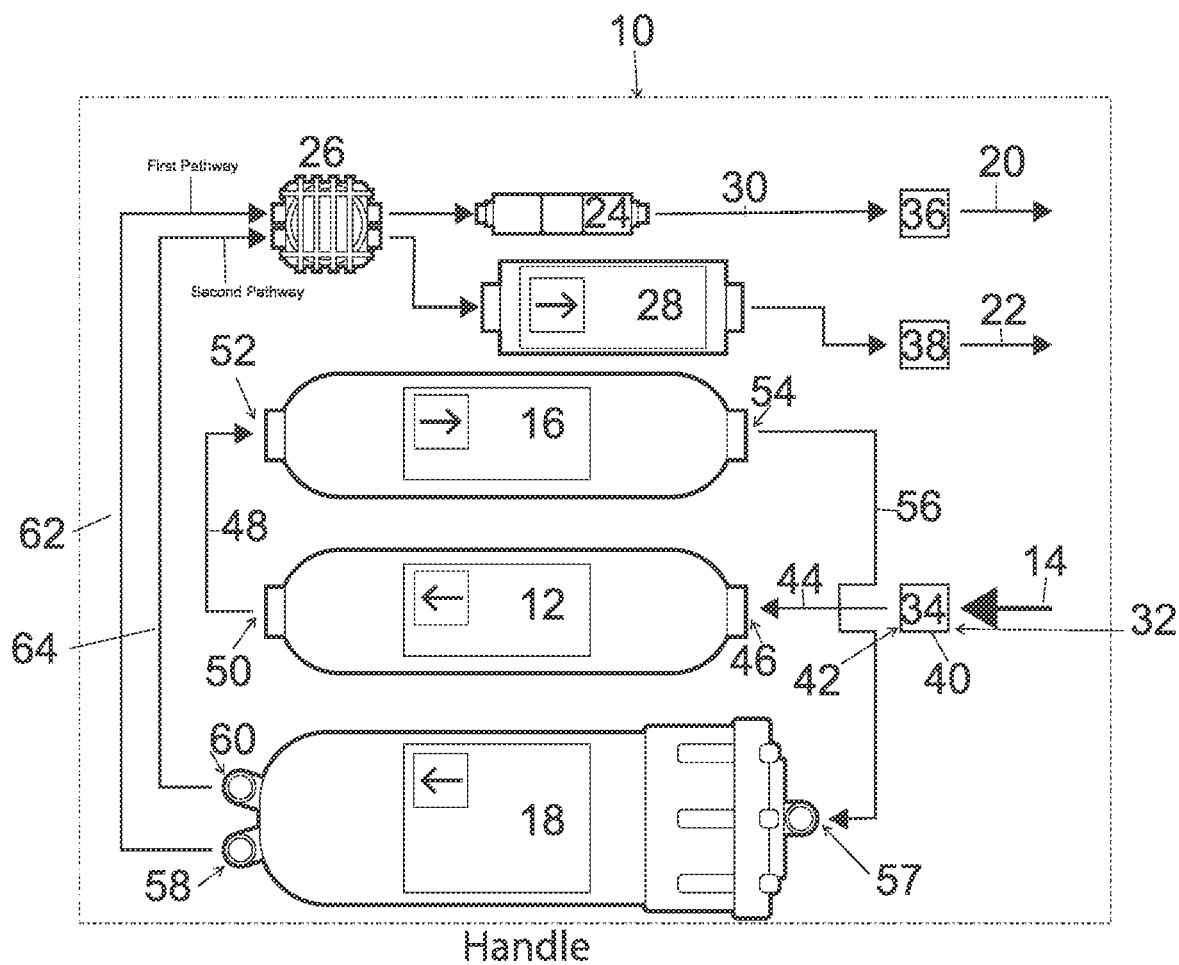
FIG. 1 shows a schematic view of one embodiment of the present invention.
Figure 2:
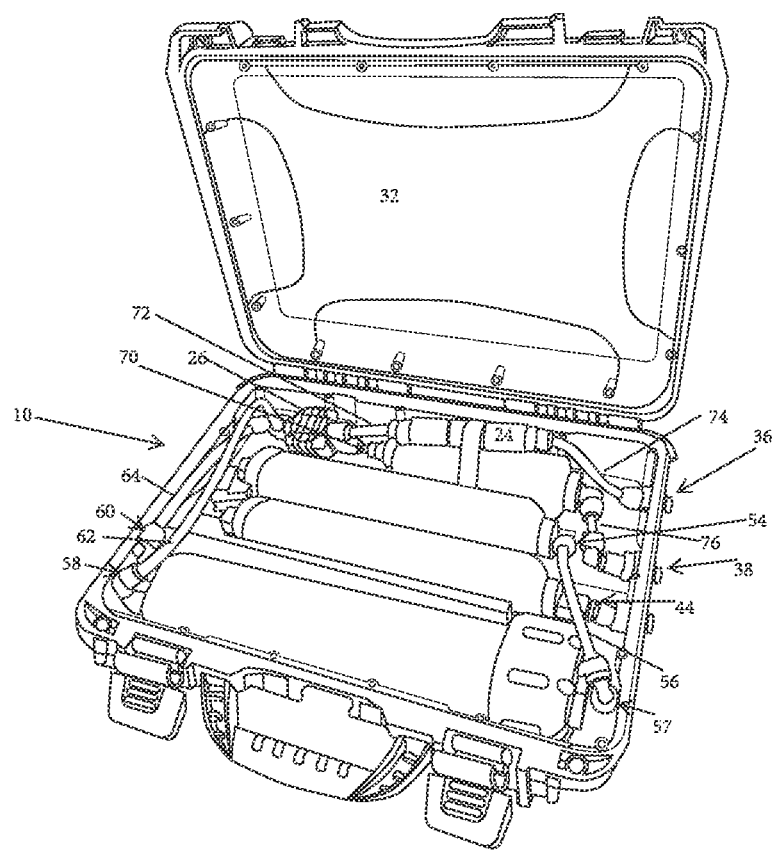
FIG. 2 shows a perspective of one embodiment of the present invention.

By way of example, and referring to FIGS. 1-2, a water purification system 10 is configured to create a treated water 22 for a home brewing operation. The water purification system 10 includes a sediment filter 12 that is connected to an untreated water source 14. Untreated water flows from the untreated water source 14 through the sediment filter 12 creating a sediment filtered water. A carbon filter 16 is connected to the sediment filter 12. The sediment filtered water flows through the carbon filter 16 creating a carbon filtered water. A reverse osmosis system 18 is connected to the carbon filter 16. The carbon filtered water flows through the reverse osmosis system 18 and is segregated into a treated water 22 and a rejected water 20. The treated water 22 is distributed to the home brewing operation.

A flow restrictor 24 is connected to the reverse osmosis system 18 with an automatic shutoff valve 26. The flow restrictor 24 is configured to regulate a first flow of rejected water.

A deionizing filter 28 is connected to the reverse osmosis system 18 with the automatic shutoff valve 26. The deionizing filter 28 receives a second flow of treated water and creates a deionized water 30.

A housing 32 is mechanically coupled to a first bulkhead union quick connect piece 34, a second bulkhead union quick connect piece 36, and a third bulkhead union quick connect piece 38. The first bulkhead union quick connect piece 34 further comprises a first bulkhead union quick connect piece outer attachment point 40 and a first bulkhead union quick connect piece inner attachment point 42. The first bulkhead union quick connect piece outer attachment point 40 is mechanically coupled to the untreated water source 14. The first bulkhead union quick connect piece inner attachment point 42 is mechanically coupled to a first interior tube 44. The first interior tube 44 is mechanically coupled to the sediment filter 12 with a first sediment filter quick connect piece 46. The sediment filter 12 is connected to a second interior tube 48 with a second sediment filter quick connect piece 50. In some embodiments, the sediment filter 12 is a ten-micron inline sediment filter.

The carbon filter 16 further comprises a carbon filter first ninety-degree push fitting 52 and a second carbon filter second ninety-degree push fitting 54. The second interior tube 48 is connected to the first ninety-degree push fitting 52. A third interior tube 56 is attached to the second carbon filter second ninety-degree push fitting 54. The carbon filter 16 can be a ten-micron coconut shell activated carbon filter.

The reverse osmosis system 18 further comprises a reverse osmosis system inlet push fitting 57 a first reverse osmosis machine outlet push fitting 58 and a second reverse osmosis machine outlet push fitting 60. The reverse osmosis system inlet push fitting 57 is mechanically coupled to third interior tube 56. The reverse osmosis system inlet push fitting 57 can further comprise a check valve that operates as a backflow protecting valve on the treated water outlet.

The automatic shutoff valve 26 further comprises a first flow pathway 62 and a second flow pathway 64. The first flow pathway 62 is mechanically coupled to the first reverse osmosis machine outlet push fitting 58 with a fourth interior tube 66. The second flow pathway 64 is mechanically coupled to the second reverse osmosis machine outlet push fitting 60 with a fifth interior tube 68.

The second flow pathway 64 is connected to the deionizing filter 28 with a sixth internal tube 70. The first flow pathway 62 is further connected to the flow restrictor 24 with a seventh internal tube 72. The flow restrictor is connected to the second bulkhead union quick connect piece 36 with eighth external tube 74. The deionizing filter 28 is connected to the third second bulkhead union quick connect piece 38 with a ninth internal tube 76.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A water purification system for a home brewing operation comprising:
    a housing having generally rectangular top and bottom walls and generally rectangular sidewalls interconnecting the top and bottom walls;
    a reverse osmosis filter having a longitudinal axis, a sidewall surrounding the longitudinal axis of the reverse osmosis filter, and first and second ends spaced along the longitudinal axis of the reverse osmosis filter, an inlet at the first end of the reverse osmosis filter, a permeate outlet at the second end of the reverse osmosis filter, and a retentate outlet at the second end of the reverse osmosis filter, wherein the reverse osmosis filter is located within the housing with its first end facing a shorter one of said sidewalls of the housing, wherein the longitudinal axis of the reverse osmosis filter is generally parallel to a longer one of the sidewalls of the housing, and wherein the sidewall of the reverse osmosis filter is adjacent to said longer one of the sidewalls of the housing;
    a sediment filter having a longitudinal axis, a sidewall surrounding the longitudinal axis of the sediment filter, and first and second ends spaced along the longitudinal axis of the sediment filter, an inlet at the first end of the sediment filter, an outlet at the second end of the sediment filter, wherein the sediment filter is located within the housing with its first end facing said shorter one of said sidewalls the housing, wherein the longitudinal axis of the sediment filter is generally parallel to said longer one of said sidewalls, and wherein the sidewall of the sediment filter is adjacent to the sidewall of the reverse osmosis filter;
    a carbon filter having a longitudinal axis, a sidewall surrounding the longitudinal axis of the carbon filter, and first and second ends spaced along the longitudinal axis of the carbon filter, an inlet at the first end of the carbon filter, an outlet at the second end of the carbon filter, wherein the carbon filter is located within the housing with its second end facing said shorter one of said sidewalls, wherein the longitudinal axis of the sediment filter is generally parallel to said longer one of said sidewalls of the housing, and wherein the sidewall of the carbon filter is adjacent to the sidewall of the sediment filter;
    a deionizing filter having a longitudinal axis, a sidewall surrounding the longitudinal axis of the deionizing filter, and first and second ends spaced along the longitudinal axis of the deionizing filter, an inlet at the first end of the deionizing filter, an outlet at the second end of the deionizing filter, wherein the deionizing filter is located within the housing with its second end facing said shorter one of said sidewalls, wherein the longitudinal axis of the deionizing filter is generally parallel to said longer one of said sidewalls of the housing, and wherein the sidewall of the deionizing filter is adjacent to the sidewall of the carbon filter;
    an automatic shut-off valve having a longitudinal axis, a sidewall surrounding the longitudinal axis of the automatic shut-off valve, and first and second ends spaced along the longitudinal axis the deionizing filter, first and second inlets at the first end of the automatic shut-off valve, first and second outlets at the second end of the automatic shut-off valve, wherein the first inlet and the first outlet of the automatic shut-off valve define a first flow path, wherein in the second inlet and the second outlet of the automatic shut-off valve define a second flow path that is separate from the first flow path, wherein the automatic shut-off valve is located within the housing with its first end facing the other one of the shorter ones of said sidewalls, wherein the longitudinal axis of the automatic shut-off valve is generally parallel to said longer one of said sidewalls of the housing, and wherein the sidewall of the automatic shut-off valve is adjacent to the other one of the longer sidewalls of said housing; and
    a flow restrictor having a longitudinal axis, a sidewall surrounding the longitudinal axis of the reverse osmosis filter, and first and second ends spaced along the longitudinal axis of the flow restrictor, an inlet at the first end of the flow restrictor, an outlet at the second end of the flow restrictor, wherein the flow restrictor is located within the housing, wherein the second end of the flow restrictor faces said shorter one of said sidewalls of the housing, wherein the longitudinal axis of the flow restrictor is generally parallel to said longer one of said sidewalls, and wherein the sidewall of the flow restrictor is adjacent to the other one of the longer sidewalls of said housing.

2. The water purification system of claim 1, further comprising:
    means located on said shorter one of the sidewalls of said housing for fluidly connecting a source of water to be purified to the inlet of the sediment filter;
    means for fluidly connecting the outlet of the sediment filter to the inlet of the carbon filter;
    means for fluidly connecting the outlet of the carbon filter to the inlet of the reverse osmosis filter;
    means for fluidly connecting the permeate outlet of the reverse osmosis filter to the first inlet of the automatic shut-off valve;
    means for fluidly connecting the first outlet of the automatic shut-off valve to the inlet of the deionizing filter;
    means located on said shorter one of the sidewalls of the housing for fluidly connecting the outlet of the deionizing filter to the home based brewing operation located outside of the housing;

means for fluidly connecting the retentate outlet of the reverse osmosis filter to the second inlet of the automatic shut-off valve;
means for connecting the second outlet of the automatic shut-off valve to the first inlet of the flow restrictor; and
means located on said shorter one of the sidewalls of the housing for fluidly connecting the outlet of the flow restrictor to a drain located outside of the housing for disposal.

\* \* \* \* \*